United States Patent [19]

Negishi

[11] Patent Number: 5,125,482
[45] Date of Patent: Jun. 30, 1992

[54] DISC BRAKE ELASTIC PRESSING MEMBERS HAVING UNEQUAL PRESSING FORCES

[75] Inventor: Toshiyuki Negishi, Saitama, Japan

[73] Assignee: Akebono Brake Industry Co., Ltd., Tokyo, Japan

[21] Appl. No.: 578,485

[22] Filed: Sep. 7, 1990

[30] Foreign Application Priority Data

Sep. 13, 1989 [JP] Japan ................................ 1-237938

[51] Int. Cl.⁵ ............................................ F16D 65/40
[52] U.S. Cl. ............................. 188/73.38; 188/73.39
[58] Field of Search ............... 188/73.35, 73.36, 73.37, 188/73.38, 205 A, 73.1, 73.39

[56] References Cited

U.S. PATENT DOCUMENTS

| 4,180,148 | 12/1979 | Souma | 188/73.38 |
| 4,245,723 | 1/1981 | Moriya | 188/73.38 X |
| 4,371,060 | 1/1983 | Iwata | 188/73.38 |
| 4,512,446 | 4/1985 | Chuwman et al. | 188/73.38 |
| 4,607,728 | 8/1986 | Kobayashi | 188/73.39 X |
| 4,915,198 | 4/1990 | Hirashita | 188/73.39 |
| 5,025,897 | 6/1991 | Hirashita | 188/73.1 X |

FOREIGN PATENT DOCUMENTS

| 0352559 | 1/1990 | European Pat. Off. | 188/73.38 |
| 1035760 | 7/1966 | United Kingdom. | |
| 1378950 | 6/1972 | United Kingdom. | |
| 2013292 | 8/1979 | United Kingdom. | |
| 2017236 | 10/1979 | United Kingdom. | |
| 2172068 | 9/1986 | United Kingdom | 188/73.38 |
| 2196072 | 9/1987 | United Kingdom. | |

Primary Examiner—Robert J. Oberleitner
Assistant Examiner—Josie A. Ballato
Attorney, Agent, or Firm—Sughrue, Mion, Zinn, Macpeak & Seas

[57] ABSTRACT

A disc brake device comprises a pair of friction pads provided on opposite sides of a disc and a support member fixed to a stationary portion of a vehicle, each of the friction pads being of a sectorial shape so as to form slant side surfaces extending in the radial direction of the disc and so as to form stepped engaging portions at the inner edge portions thereof, the support member having first anchor portions onto which the slant side surfaces abut respectively and second anchor portions for receiving the stepped engaging portions, characterized in that elastic pressing members are interposed between end portions of the support member at disc run-in and run-out sides thereof at the time of forward running of the vehicle and outer edges of each of the friction pads, and pressing force of the elastic pressing members against the friction pads is made larger on the disc run-in side than on the disc run-out side.

4 Claims, 3 Drawing Sheets

DISC BRAKE ELASTIC PRESSING MEMBERS HAVING UNEQUAL PRESSING FORCES

BACKGROUND OF THE INVENTION

The present invention relates to a disc brake device, and particularly relates to an improvement in a disc brake device in which the anchoring property of friction pads is improved.

A conventional disc brake device has a structure in which a pair of friction pads are provided on opposite sides of a brake disc and held slidably in an axial direction of the disc by a support member secured to a stationary portion of a vehicle. The friction pads are pressed by a hydraulic actuator into frictional engagement with the disc to thereby obtain braking force. In the disc brake device of this kind, it is necessary that the braking force generated by the friction pads when the friction pads pressingly sandwich the disc is effectively and dispersedly transmitted to the support member. Accordingly, as shown in FIG. 4, U.S. Pat. No. 4,915,198 discloses a disc brake device having a structure in which each of friction pads is of a sectorial shape so as to form slant side surfaces extending substantially along the radial direction of the disc, the center of the inner circumferential portion of the friction pad is cut out so as to form stepped engaging portions opposed to each other, and on the other hand, the support member is provided with anchor portions for receiving the slant side surfaces respectively and anchor portions for receiving the stepped engaging portions respectively. In such a structure, the braking force causes the slant side surfaces of the friction pads to abut onto the corresponding anchor portions at the disc run-out side, while it causes the stepped engaging portions of the friction pads to engage with the anchor portions at the disc run-in and disc inner-circumferential side, so that the braking force is dispersedly transmitted to the support member. Accordingly, the transforming action of the support member is suppressed.

In the above configuration, because the moment for causing the friction pads to rotate along the disc surface in braking is generated, a structure in which the outer circumferential edges of the friction pads are pressingly supported by spring members or the like is employed as disclosed in EP No. 352559 (corresponding to U.S. Ser. No. 07/378101). In the structure, anchoring clips preferably made of a rust preventing material are generally provided on anchor portions for preventing wear so that the outer circumferential end edges of the friction pads are pressed toward the center of the disc both at the disc run-in and run-out sides thereof.

In the conventional disc brake device, however, the pressing forces caused by the anchoring clips so as to press the friction pads from their outer edges are set so as to be equal both at the disc run-in and run-out sides thereof. Accordingly, in the not-braking state, the urging load $P_i$ at the disc run-in side and the load $P_o$ at the disc run-out side are exit side are equal to each other, so that clearances A and B between the inner circumferential stepped engaging portions of the friction pad and the anchor portions of the support member are equal to each other.

However, at the time of the braking, each friction pad moves until the clearance A at the disc run-in side becomes zero, and the pushing-up force C is generated along the radial direction of the disc at the disc run-in side. Accordingly, there have been problems in that the friction pad is in an unstable state until it closely contacts with one of the anchor portions which receive the braking force, so that noises are generated and uneven wear of the lining due to irregular movement of the friction pad occurs.

SUMMARY OF THE INVENTION

The present invention has been made in view of the problems in the prior art, and an object thereof is to provide a disc brake device having a structure in which in the not-braking state, the clearance between each friction pad and the anchor portion of the support member is always as in the braking state in which the clearance between the friction pad and the anchor portion of the support member can be disregarded, the pad is stably held, vibration noises are prevented from occurring, and uneven wear of the lining can be suppressed.

In order to attain the objects described above, according to the present invention, the disc brake device having a pair of friction pads provided at opposite sides of a brake disc and a support member fixed to a stationary portion of a vehicle, each of the friction pads being of a substantially sectorial shape so as to form slant side surfaces extending in the radial direction of the disc and so as to form stepped engaging portions at the inner edge portions thereof, the support member having first anchor portions onto which the slant side surfaces abut respectively and second anchor portions for receiving the stepped engaging portions, is characterized in that elastic pressing members are interposed between end portions of the support member at disc run-in and run-out sides thereof at the time of forward running of the vehicle and outer edges of each of the friction pads, and pressing force of the elastic pressing members against the friction pads is made larger on the disc run-in side than on the disc run-out side.

According to the above configuration, in the not-braking state time, the urging loads act unbalancedly on each friction pad at its opposite left and right ends along the rotation direction of the disc. Accordingly, the inner-circumferential stepped engaging portion of each friction pad at the disc run-in side is made to abut onto the corresponding anchor portion of the support member, so that the clearance is relatively enlarged at the disc run-out side. At that time, the friction pad per se is pressed down as a whole, so that the slant side surfaces are closely contacted with the first anchor portions of the support member. In such a state, when braking operation is performed, the stepped engaging portion of the pad may keep in contact with the inner circumferential anchor portion of the support member, so that the pad can stably transmit braking force to the support member without generation of vibration such as judder or the like. Accordingly, a stable braking effect is generated, and uneven wear of lining is suppressed from occurring because each friction pad is not irregularly moved.

DETAILED DESCRIPTION OF THE PREFERRED EMBODIMENTS

Figure 1:
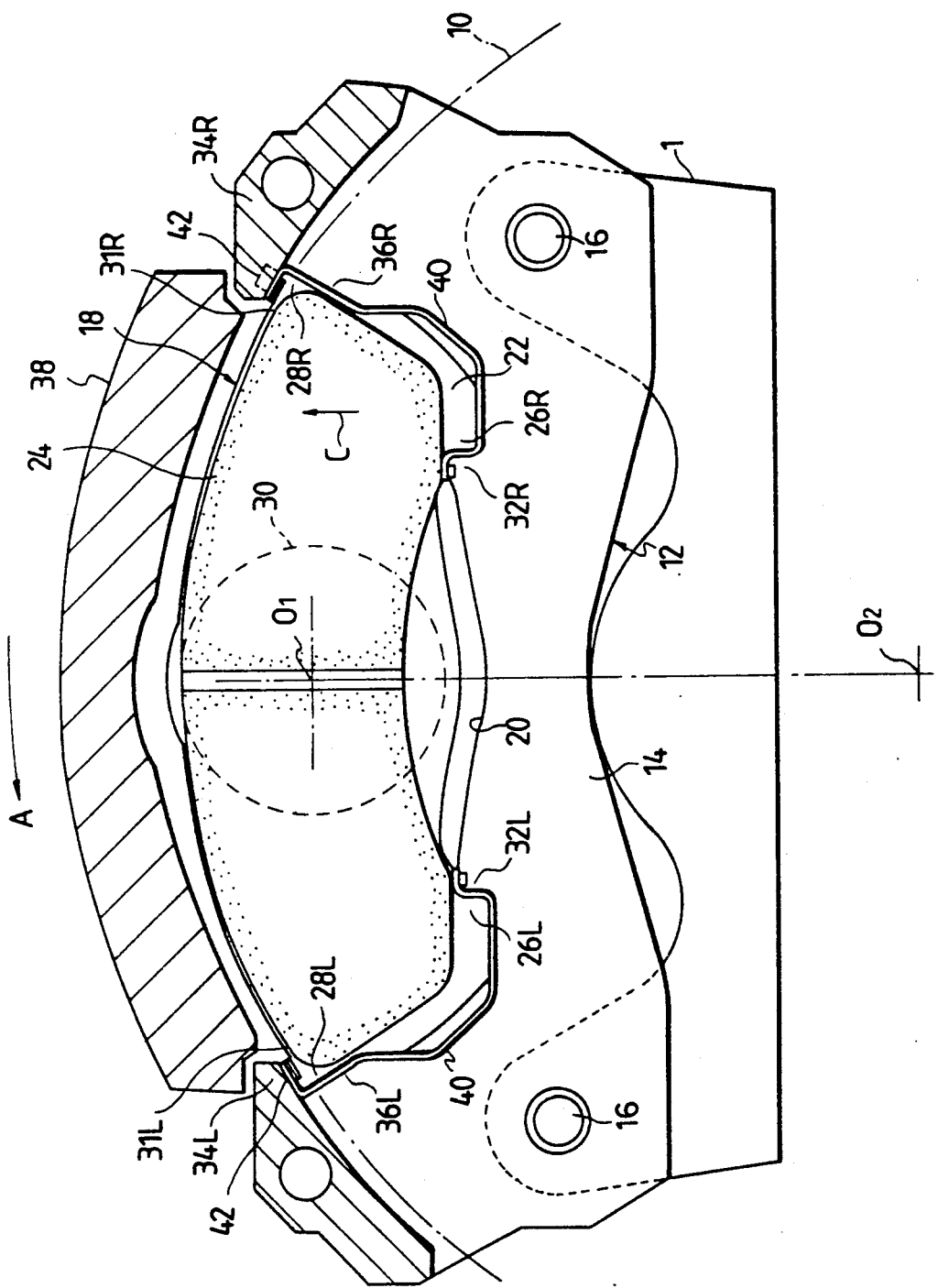
FIG. 1 is a sectional view of the disc brake device according to an embodiment of the present invention.

Referring to the drawings, an embodiment of the disc brake device according to the present invention will be described hereunder.

FIG. 1 is a sectional view of the disc brake device according to the embodiment, which shows the disc brake device viewed from the disc side toward the inner side. The disc brake is provided with a support member 12 formed into a U-shape in section so as to straddle a brake disc 10. The support member 12 is provided with an inner bridge 14 so as to be disposed at one side of the disc 10 and fixed to a stationary portion 1 of a vehicle through screw holes 16 formed on opposite ends of the support member 12. Further, the support member 12 has an outer bridge (not shown) disposed at the other side of the disc 10. An opening portion 20 for holding a friction pad 18 is formed in the inner bridge 14 so as to substantially coincide with the outer shape of the friction pad 18. The friction pad 18 is comprised of a back plate 22 and a friction lining 24 fixed on the front surface of the back plate 22. The back plate 22 is formed horizontally and symmetrically sectorial in shape and the inner circumferential central portion of the back plate 22 is cut out, so that stepped engaging portions 26R and 26L are formed on the opposite end portions of the inner circumferential edge so as to oppose to each other. In that case, the stepped engaging portions 26R and 26L have respective engaging surfaces parallel to a line connecting an operational center $O_1$ of a piston 30 for giving pressing force for brake operation to the friction pad 18 and a rotation center $O_2$ of the disc 10. The braking force is transmitted to the support member 12 when the engaging surface of the stepped engaging portion 26R or 26L disposed at the disc run-in side thereof abuts onto the support member 12. Further, side end surfaces of the friction pad 18 at the disc run-in and run-out sides are formed so as to be slant side surfaces 28R and 28L each having an upper half portion extending along the substantially radial direction of the disc 10. The braking force is transmitted to the support member 12 through the slant side surfaces 28R and 28L.

On the other hand, pulling anchor portions 32R and 32L engageable with the stepped engaging portions 26R and 26L are provided on the inner circumferential side of the support member 12 so as to suppress the movement of the friction pad 18 in the horizontal direction in the drawing and to receive the braking force from the friction pad 18. The engaging surfaces of the pulling anchor portions 32R and 32L are made to face the disc run-in and run-out sides respectively and are formed so as to be parallel (vertical in the drawing) to the line connecting the operational center $O_1$ of the piston 30 and the rotational center $O_2$ of the disc 10. Further, float preventing anchor portions 34R and 34L are provided on the support member 12 corresponding to outer-edge corner portions 31R and 31L on the back plate 22 of the friction pad 18. The float preventing anchor portions 34R and 34L are formed by projecting the outer edge of the opening 20 of the support member 12 so as to support the friction pad 18 when the friction pad 18 moves to float. Further, pushing anchor portions 36R and 36L for receiving the braking force are provided on the support member in opposition to the slant side surfaces 28R and 28L under the outer-edge corner portions 31R and 31L of the friction pad 18.

Although not shown in the drawing, the support member 12 has the outer bridge on the opposite side of the inner bridge 14. Another friction pad having a similar structure to that of the friction pad 18 is also provided on the outer bridge through a caliper 38.

Figure 3:
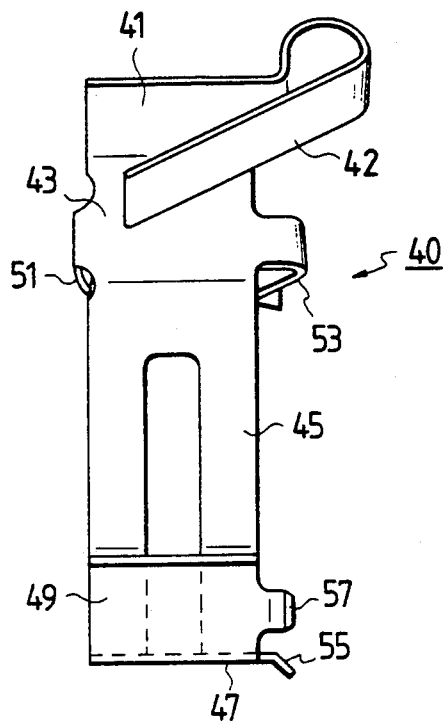
FIGS. 3(1)-3(3) are a front view and a side view of an anchoring clip, and a view viewed from the direction shown by an arrow A in FIG. 3(2) respectively.
Figure 3:
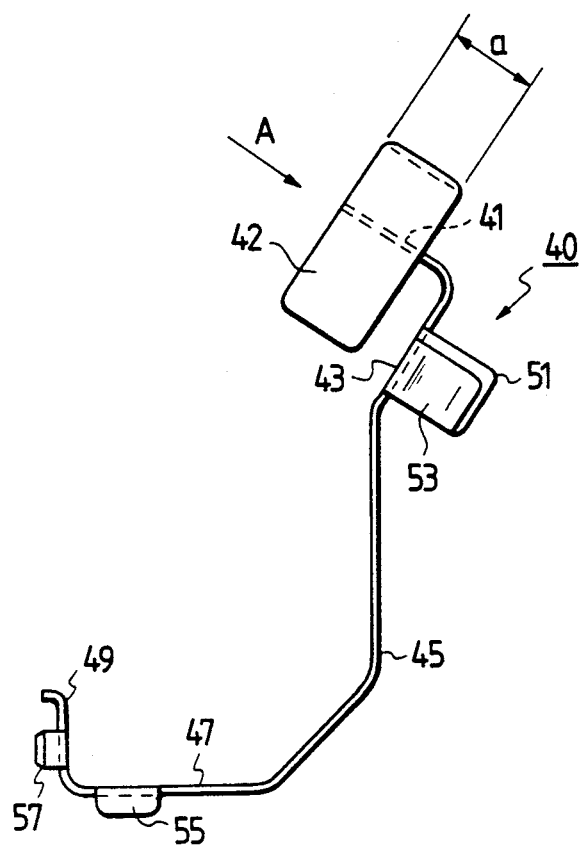
Figure 3:
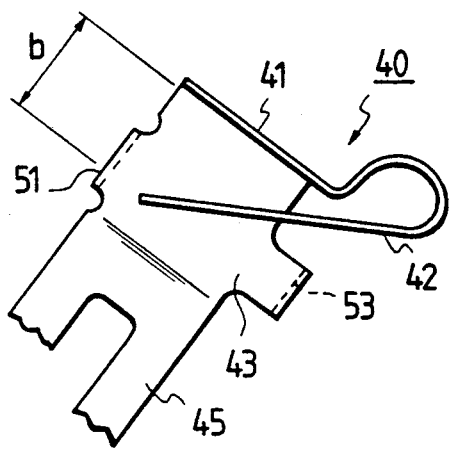

In the above configuration in which the friction pad 18 is provided on the support member 12 as described above, anchoring clips 40 for improving abrasion resistance of the respective anchor portions are attached to the support member 12. The anchoring clips 40 are attached to the disc run-in and run-out sides respectively at the time when the vehicle runs forward. A single anchoring clip 40 is arranged to protect and continuously cover the outer circumferential float preventing anchor portion 34R (34L), the pushing anchor portion 36R(36L), and the pulling anchor portion 32R (32L). FIG. 3 shows a specific structure of the anchoring clip 40. The anchoring clip 40 is bent so that a first anchor plate 41 combined with the float preventing anchor portion 34R (34L) is substantially perpendicular to a second anchor plate 43 combined with the pushing anchor portion 36R (36L). A connecting plate 45 is extended from the lower edge of the second anchor plate 43 extended along the radial direction of the disc. A top end of the connecting plate 45 is bent to thereby form a horizontal surface portion 47, and the horizontal surface portion 47 is vertically upwardly extended to thereby form a third anchor plate 49 to be combined with the pulling anchor portion 32R (32L). In that case, the connecting plate 45 is bent to expand outwards so as to have an escape in order not to contact with any of the support member 12 and the friction pad 18. In order to fixedly hold the anchoring clip 40 by the support member 12, a bent piece 51 is provided on one side edge of the second anchor plate 43 and a bent spring piece 53 is bently provided on the other side edge of the second anchor plate 43 in opposition to the bent piece 51 so as to perform spring function, so that the support member 12 is sandwiched by the pieces 51 and 53. Accordingly, the anchoring clip 40 is fixedly held by the support member 12. Further, guide pieces 55 and 57 for guiding the friction pad 16 to be attached to the support member 12 are provided bently towards the anchor sides of the support member 12 on one-side edges of the horizontal surface portion 47 and the third anchor plate 49, respectively.

In the disc brake device of the embodiment, the friction pad 18 is pressed down by the anchoring clip 40 towards the side of the center of the disc 10. The operation is performed such that tongue pieces are provided on side edges of the first anchor plates 41 opposed to the float preventing anchor portions 34R and 34L of the anchoring clips 40 respectively, the tongue portions are bent so as to form elastic pressing portions 42 respectively, and the elastic pressing portions 42 always urge to press down the outer-edge corner portions 31R and 31L of the friction pad 18 against the support surfaces of the float preventing anchor portions 34R and 34L. A pad urging load $P_i$ on the disc run-in side and a load $P_o$ on the disc run-out side, which are caused by such elastic pressing portions 42 while the disc rotor 10 rotates as the vehicle runs forward, are established so as to satisfy the following expression.

$$P_i > P_o \tag{1}$$

Figure 2:
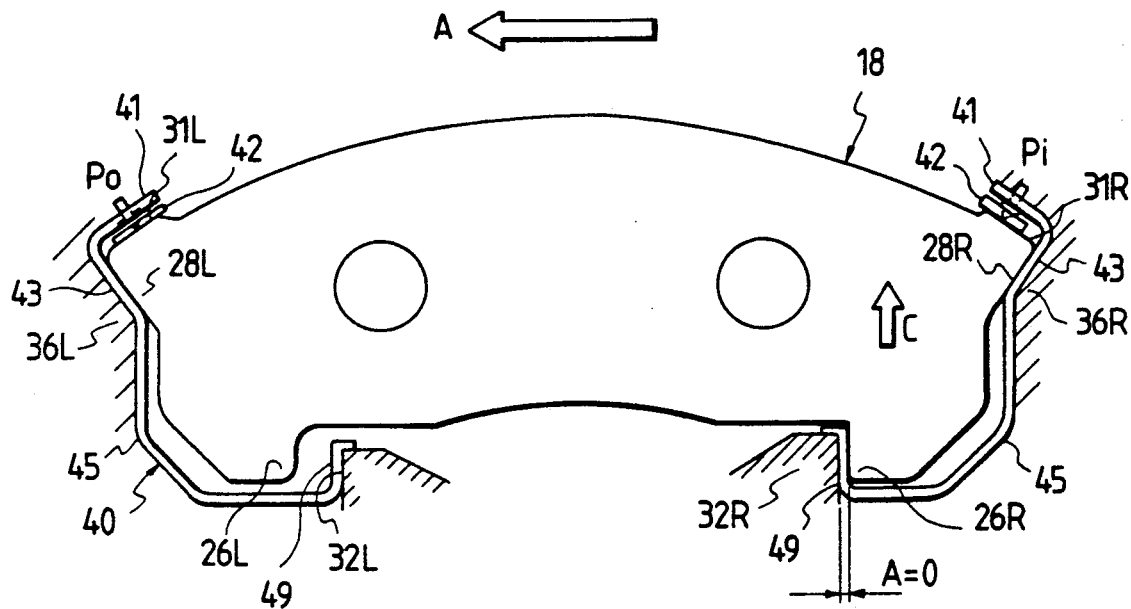
FIG. 2 is a schematic view showing the relation between a support member and a friction pad.
Figure 4:
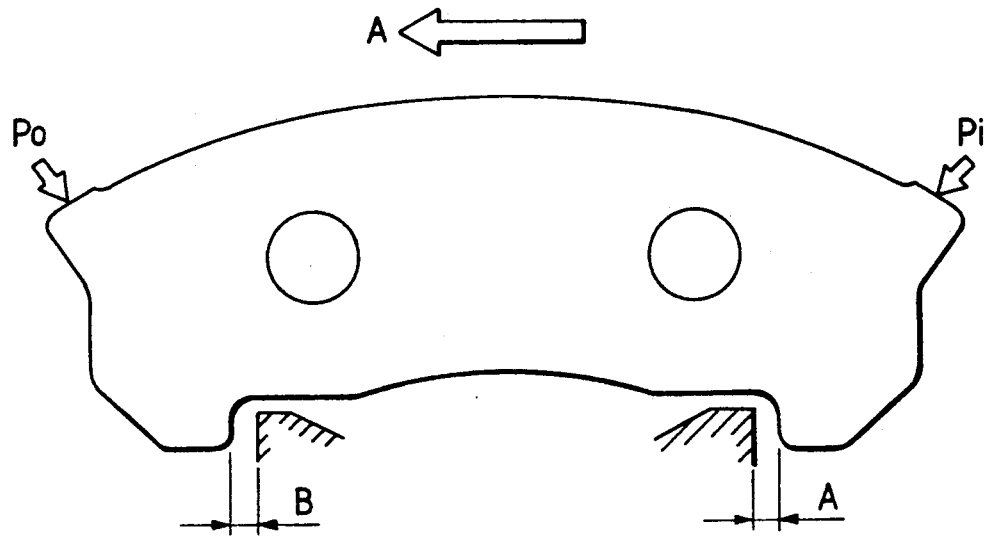
FIG. 4 is a schematic view showing the relation between a support member and a friction pad in a conventional disc brake device.

This is realized by selecting a spring factor of the elastic pressing portions 42 on the disc run-in side to be larger than that of the disc run-out side. The pressing forces of the opposite elastic pressing portions 42 are unbalanced, so that the friction pad 18 is set to be in., the same posture as the braking state in a not-braking state. That is, as schematically shown in FIG. 2, a load difference is made between the elastic pressing portions 42 so that a clearance A between the stepped engaging portion 26R in the disc run-in side and the pulling anchor portion 32R is made to be substantially "0" by making the pad urging load $P_i$ on the disc run-in side larger than the load $P_o$ on the disc run-out side. In this case, specific set loads Pi and Po may be selected to be, for example as shown in the following table.

TABLE 1

| | Load (kgf) | Load Adjustment size (mm) | | |
|---|---|---|---|---|
| | | Plate thick | a size | b size |
| Disc run-in side | $P_i = 2.5$ | $t = 0.5$ | 8 | 9 |
| Disc run-out side | $P_o = 0.6$ | $t = 0.4$ | 7 | 6 |

In Table-1, the "a size" and "b size" represent the maximum distance between the elastic pressing portion 42 and the first anchor plate 41, and the width of the elastic pressing portion 42, respectively.

Such load setting conditions are obtained from the following matters. The load difference $P_i - P_o$ between both the clips is determined in view of countermeasures for wrong sliding (scratching) of the pad and in view of positioning of the pad. In the preferred embodiment of the invention, the load difference is determined so that the following expression is satisfied.

$$10 \ kgf \geq P_i - P_o \geq 0.8 \ kgf$$

Further, the minimum load $P_o$ of the clip on the disc run-out side may be determined in view of countermeasures for rattle sound, and in the preferred embodiment, it is established so as to satisfy following expression.

$$P_o \geq 0.5 \ kgf$$

Further, the maximum load $P_{imax}$ of the clip on the disc run-in side may be determined in view of countermeasures for the drag torque and uneven wear of the friction pad, and in the preferred embodiment, it is established so as to satisfy the following expression.

$$P_{imax} \leq 10 \ kgf$$

The operation of the thus arranged disc brake device is described now. When the braking operation is performed in the case where the disc 10 rotates together with a wheel in the direction shown by an arrow in the drawing, the braking force caused by the friction pad 18 is received by the pulling anchor portion on the disc run-in side, that is, on the right side of the bridge of the support member 12, and the pushing anchor portion 36L on the disc run-out side. Accordingly, the braking force received by the support member 12 is continuously dispersed from the initial stage of braking onto the disc run-in and run-out sides so that transformation operation force of the braking force onto the support member 12 is reduced. A rotational moment is generated in the friction pad 18 by the brake tangential force applied to the friction pad 18 to thereby generate floating force C on the friction pad 18 at the disc run-in side thereof. Floating is prevented by the urging force of the elastic pressing portion 42 interposed between the float preventing anchor portion 34R and the friction pad 18.

Here, the pad urging loads $P_i$ and $P_o$ of the elastic pressing portion 42 on the disc run-in and run-out sides are different in degree from each other, and the load $P_i$ on the disc run-in side is selected to be larger than the load $P_o$. Accordingly, even in the not-braking state, the friction pad 18 is as in the braking state position, so that the stepped engaging portions 26R is made to abut on the pulling anchor portion 32R without any clearance therebetween. The opposite elastic pressing portions 42 have urging forces to operate wedge function between the slant side surfaces 28R and 28L and the pushing anchor portions 36R and 36L, so that the friction pad 18 is maintained in the abutting state even in the not-braking state. Accordingly, when the braking force is transmitted from the initial stage of braking, the friction pad 18 never vibrates as in conventional disc brakes where the existence of the clearance A before the effect of braking appears, so that stable braking can be always performed.

Although each of the elastic pressing portions 42 is formed by bending one portion of the anchoring clip 40 in the preferred embodiment, independent elastic pressing materials may be interposed between the anchoring clips 40 and the float preventing anchor portions 34R and 34L respectively.

As described above, in the disc brake device according to the present invention, the pressing members interposed at the outer-edge corners on the disc run-in and run-out sides so as to prevent the friction pad from floating are set so that the pad urging load on the disc run-in side becomes larger than that on the disc run-out side to thereby make the friction pad abut onto the support member in the state similar to the braking state. Accordingly, such effects that the friction pad can stably transmit braking force to the support member from the initial stage of braking, no vibration such as judder or the like of the friction pad is generated, and the generation of noise is effectively prevented.

What is claimed is:

1. A disc brake device for a motor vehicle, comprising:
    a friction pad, provided at opposite sides of a disc, and being of a sectorial shape so as to form slant side surfaces on outer side edges extending in the radial direction of said disc and so as to form stepped engaging portions at the inner edge portions thereof;
    a support member fixed to a stationary portion of said vehicle, said support member having first anchor portions onto which said slant side surfaces abut respectively, said first anchor portions including pushing anchor portions for receiving said slant side surfaces of said friction pad, and second anchor portions, including pulling anchor portions, for receiving said stepped engaging portions;
    elastic pressing members, interposed between end portions of said support member at disc run-in and run-out sides thereof at the time of forward running of said vehicle and outer edges of said friction pad, a pressing force of said elastic pressing members against said friction pad is made larger on said disc run-in side than on said disc run-out side; and wherein said friction pad is pressed by a respective one of said elastic pressing members in such a manner that a pad clearance between each of said stepped engaging portions and said pulling anchor portions at the disc run-in side is made to be substantially zero.

2. The disc brake device according to claim 1, further comprising anchoring clips provided on anchor portions of said support member for preventing wear.

3. The disc brake device according to claim 2, wherein each of said anchoring clips comprises:
a first anchor plate provided on the end portion at the disc run-in and run-out side of said support member at the time of forward going of said vehicle;
a second anchor plate provided in bent fashion to said first anchor plate at a predetermined angle, said second anchor plate being provided on said pushing anchor portion;
a connecting plate provided in bent fashion to said second anchor plate; and
a third anchor plate provided in bent fashion to said connecting plate at a predetermined angle, said third anchor plate being provided on each of said pulling anchor portions.

4. The disc brake device according to claim 3, wherein each of said elastic pressing members is integrally provided to a side edge of said first anchor plate of each of said anchoring clips so as to urge an outer-edge corner portion of said friction pad against the end portion on the respective disc run-in and the run-out side of said support member.

* * * * *